United States Patent
Bach et al.

(10) Patent No.: US 9,647,281 B2
(45) Date of Patent: May 9, 2017

(54) METHOD OF OPERATING A FUEL CELL APPARATUS AND FUEL CELL APPARATUS HAVING A CHARGE LIMITER

(71) Applicant: Volkswagen Aktiengesellschaft, Wolfsburg (DE)

(72) Inventors: Peter Bach, Burnaby (CA); Matthew Kenneth Hortop, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 106 days.

(21) Appl. No.: 14/700,464

(22) Filed: Apr. 30, 2015

(65) Prior Publication Data

US 2015/0318591 A1   Nov. 5, 2015

(30) Foreign Application Priority Data

Apr. 30, 2014  (DE) .................. 10 2014 208 229

(51) Int. Cl.
*H01M 16/00* (2006.01)
*H02J 7/00* (2006.01)
(Continued)

(52) U.S. Cl.
CPC ..... *H01M 8/04223* (2013.01); *H01M 8/0432* (2013.01); *H01M 8/04947* (2013.01);
(Continued)

(58) Field of Classification Search
CPC ............ H01M 16/006; H01M 8/0432; H01M 8/04947; H01M 2250/20; H01M 2220/20; H02J 7/0052
(Continued)

(56) References Cited

U.S. PATENT DOCUMENTS 4,650,729 A    3/1987  Nakamura et al.
6,495,277 B1 *  12/2002 Edlund et al. .... H01M 8/04037
                                                         320/101
(Continued)

FOREIGN PATENT DOCUMENTS

DE         3528673 A1    2/1986
DE    102013101826 A1   10/2013
(Continued)

OTHER PUBLICATIONS

Search Report for German Patent Application No. 10 2014 208 229.3, dated Mar. 10, 2015.

*Primary Examiner* — Sun Lin
(74) *Attorney, Agent, or Firm* — Pearl Cohen Zedek Latzer Baratz LLP

(57) ABSTRACT

A method for operating a fuel cell device, the fuel cell device having a fuel cell, and a motor vehicle having a drive system and the fuel cell device are disclosed. In order to avoid energy which has been made available by the fuel cell device being used merely to heat the fuel cell and therefore not being available for a consumer, there is provision according to the invention that the energy to be stored is limited as a function of the ambient temperature and the fuel cell device has for this purpose an ambient temperature-determining unit and a charge limiter which is connected to the ambient temperature-determining unit in a control signal-transmitting fashion.

10 Claims, 2 Drawing Sheets

(51) Int. Cl.
 *H01M 8/04* (2016.01)
 *H01M 8/04223* (2016.01)
 *H01M 8/04828* (2016.01)
 *H01M 8/0432* (2016.01)

(52) U.S. Cl.
 CPC ....... *H01M 16/003* (2013.01); *H01M 16/006* (2013.01); *H02J 7/0052* (2013.01); *H01M 8/04268* (2013.01); *H01M 2220/20* (2013.01); *H01M 2250/20* (2013.01); *Y02T 90/32* (2013.01)

(58) Field of Classification Search
 USPC ........................................................ 320/101
 See application file for complete search history.

(56) References Cited

U.S. PATENT DOCUMENTS

| | | | | |
|---|---|---|---|---|
| 7,231,877 B2* | 6/2007 | Kumar | ...................... | B60L 7/06 105/35 |
| 7,430,967 B2* | 10/2008 | Kumar | ...................... | B60L 7/06 105/35 |
| 9,531,023 B2* | 12/2016 | Tanaka et al. | .... | H01M 8/04007 |
| 2005/0008904 A1* | 1/2005 | Suppes | ............... | B60L 11/1881 429/9 |
| 2006/0088738 A1* | 4/2006 | Aso | ................... | H01M 8/04007 429/9 |
| 2007/0275272 A1 | 11/2007 | Muramatsu | | |
| 2009/0136803 A1* | 5/2009 | Yamamoto | ........ | H01M 8/04007 429/412 |
| 2010/0119898 A1* | 5/2010 | Imai | ................. | H01M 8/04156 429/430 |
| 2010/0273080 A1* | 10/2010 | Noguchi et al. | .... | B60L 11/1881 429/442 |
| 2011/0061612 A1* | 3/2011 | Haase et al. | .......... | F01K 25/005 123/3 |
| 2013/0260185 A1* | 10/2013 | Cartwright et al. | ................. | H01M 8/04223 429/9 |

FOREIGN PATENT DOCUMENTS

| | | |
|---|---|---|
| DE | 102012018710 A1 | 3/2014 |
| WO | WO2014044340 | 3/2014 |

* cited by examiner

METHOD OF OPERATING A FUEL CELL APPARATUS AND FUEL CELL APPARATUS HAVING A CHARGE LIMITER

CROSS REFERENCE TO RELATED APPLICATION

The application claims priority to Germany Patent Application No. 102014208229.3, filed Apr. 30, 2014, which is hereby incorporated by reference.

BACKGROUND OF THE INVENTION

The invention relates to a method for operating a fuel cell apparatus or device, in which method electrical energy is made available with a fuel cell and at least partially stored. In addition, the invention relates to a fuel cell apparatus or device having a fuel cell and an accumulator for electrical energy, which is connected to the fuel cell in an energy-transmitting fashion. Furthermore, the invention relates to a motor vehicle having a drive system and a fuel cell apparatus or device which is connected to the drive system in a drive energy-transmitting fashion.

Methods for operating fuel cell devices and fuel cell devices and motor vehicles with fuel cell devices are generally known. For example, documents DE 102012018710 A1 and DE 1 0201 31 01 826 A1 disclose fuel cell apparatuses or devices with accumulators.

In order to be able to keep the fuel cell in an optimum operating state, the electric accumulator is used and, for example, filled with electrical energy if a consumer of the fuel cell energy requires only a small amount of energy. The fuel cell can, therefore, be operated in an optimum operating state in which it generates more energy than the consumer requires. In the optimum operating state, the fuel cell can, for example, be operated with a high efficiency level. Furthermore, the accumulator can output energy to the consumer if the latter requires more energy than the fuel cell can make available, in particular in its optimum operating state.

However, if ambient temperatures which are below an optimum ambient temperature for the operation of the fuel cell prevail when the fuel cell is put into operation, the fuel cell has to be heated up in order to reach an optimum operating temperature as quickly as possible. However, if the consumer requests only a small amount of electrical energy from the fuel cell, and the accumulator cannot take up any energy, the fuel cell must be heated in order to be able to raise its operating temperature as quickly as possible to an optimum range. However, heating the fuel cell, for example with a heating device which can be operated electrically, requires energy which is then no longer available for the consumer.

SUMMARY OF THE INVENTION

The invention is then based on the object of making available a method for operating a fuel cell apparatus or device, and a fuel cell apparatus or device, and a motor vehicle having a fuel cell apparatus or device, wherein the fuel cell can be operated efficiently.

For the aforementioned method, the object is achieved in that a value for a maximum amount of energy to be stored is predefined as a function of an ambient temperature of the fuel cell. The inventive solution is achieved for the aforementioned fuel cell apparatus or device in that the fuel cell device has an ambient temperature-determining unit and a charge limiter, wherein the charge limiter is designed to limit the maximum amount of energy to be stored in the accumulator, as a function of a control signal of the ambient temperature-determining unit. For the motor vehicle, the object is achieved in that the fuel cell device is a fuel cell device according to the invention.

If the fuel cell device is then put into operation at a low ambient temperature, and the consumer does not request sufficient energy from the fuel cell for said fuel cell to heat itself up to an optimum operating temperature by means of internal losses, it is nevertheless possible that the fuel cell can output sufficient energy to heat itself sufficiently by means of the internal losses. The energy which is not required by the consumer is stored in the accumulator and, therefore, continues to be available for the consumer.

The inventive solution can be improved further by means of various refinements which are each advantageous per se and, unless stated otherwise in an individual case, can be combined with one another as desired. Details are given below on these embodiments and on the advantages associated therewith.

For example, the ambient temperature can be compared with a predefined temperature and the maximum amount of energy to be stored can be limited if the ambient temperature is below the predefined temperature. By means of the comparison, the maximum amount of energy to be stored can be limited in a flexible way for different ambient temperatures.

The fuel cell device can in particular be designed to carry out the method according to the invention.

The ambient temperature can be an ambient temperature which is prevailing at a predefined time or when the consumer is switched off. The time is, for example, 6 pm. If the ambient temperature is below a predetermined temperature, for example below a setpoint temperature, the ambient temperature-determining unit can generate and output the control signal.

If the ambient temperature is below the setpoint temperature, there is a high probability of, for example, more than 50%, 75% or 90% that an ambient temperature which prevails when the starting process is imminent is below an optimum temperature range for the operation of the fuel cell. The ambient temperature can therefore be an ambient temperature which is expected to prevail during an imminent starting process and which is estimated, for example, on the basis of a current ambient temperature. For example, the ambient temperature which is expected to prevail is below zero degrees Celsius or the setpoint temperature for the current ambient temperature is above zero degrees Celsius, for example 3 degrees Celsius.

In order to be able to determine the ambient temperature which is expected to prevail, the ambient temperature-determining unit can have a temperature prediction unit for predicting expected ambient temperatures, wherein the ambient temperature-determining unit can estimate the expected ambient temperature on the basis of the currently prevailing ambient temperature. In order to determine the currently prevailing temperature, the fuel cell device can have a temperature sensor which is connected to the temperature prediction unit in a measurement signal-transmitting fashion.

However, a conclusion about the ambient temperature which is expected to prevail on the basis of the current ambient temperature may be susceptible to errors. For example, the ambient temperature can increase during the night or can drop so severely that either no energy is required to heat up the fuel cell or the energy which can be taken up by the accumulator is not sufficient to heat up the fuel cell quickly enough, even in combination with the energy requested by the consumer. In order to be able to better estimate the ambient temperature which is expected to prevail, the ambient temperature-determining unit can have a data input for receiving temperature data representing expected ambient temperatures. The temperature data can be made available, for example, via data radio or some other data source, for example a charging station for the accumulator.

The maximum amount of energy to be stored is preferably predefined in a limited way such that a difference in energy between the maximum amount of energy which can be stored and the predefined maximum amount of energy to be stored is sufficient for the fuel cell to heat itself up sufficiently by means of internal losses when the difference in energy is made available at a start of the fuel cell device. In this context, the difference in energy can be stored at least partially or even completely in the accumulator.

If the consumer is put into operation together with the fuel cell, the difference in energy can be dimensioned in such a way that this, together with the amount of energy which is required by the consumer, is sufficient for the fuel cell to heat itself up sufficiently. If the fuel cell is already to be preheated to an optimum degree when the consumer is put into operation, the difference in energy can be defined in such a way that it is sufficient for the fuel cell to heat itself up sufficiently as a result of the provision of said difference in energy.

The accumulator can be, for example, a capacitor which can quickly take up and output electrical energy. However, in order to store electrical energy, rechargeable batteries are often used. In order to avoid a separate accumulator, for example the capacitor, the accumulator can be the rechargeable battery.

The fuel cell device can be a fixed fuel cell device which supplies, for example, a residential building or an industrial installation with electrical energy. If the fuel cell device is a fuel cell device for a motor vehicle, the accumulator can be a rechargeable battery which stores drive energy for the motor vehicle. This is particularly advantageous since a separate accumulator would unnecessarily require installation space and would increase the weight of the fuel cell device. However, installation space is often available to a limited degree, in particular in motor vehicles. Additional weight increases the consumption of the motor vehicle.

BRIEF DESCRIPTION OF THE DRAWINGS

In the text which follows, the invention will be explained by way of example on the basis of embodiments with reference to the drawings. The different features of the embodiments can be combined independently of one another here, as has already been stated with respect to the individual advantageous embodiments. In the drawings.

DETAILED DESCRIPTION OF THE INVENTION

Figure 1:
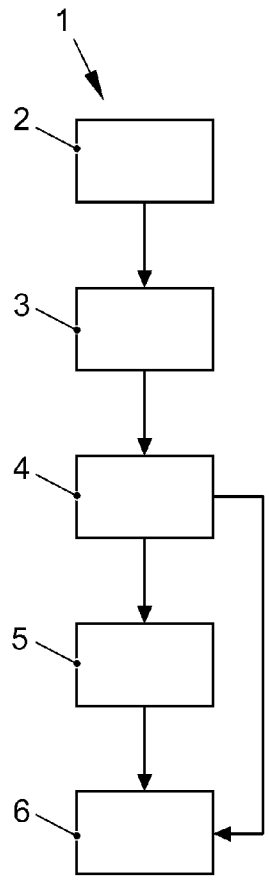
FIGS. 1 to 3 show schematic illustrations of exemplary embodiments of a method according to the invention.

Firstly, the method according to the invention will be described with reference to the exemplary embodiment in FIG. 1. FIG. 1 shows the method 1 according to the invention in a schematic form as a flowchart. In a first method step 2, the method 1 starts. For example, the method 1 starts at a predetermined time or before a consumer which is supplied with a fuel cell device switches off. If the consumer is a drive system for a motor vehicle, the method 1 can start if the motor vehicle is at a predefined distance from a predefined destination.

In a method step 3 which follows the method step 2, a current ambient temperature of the fuel cell device can be determined and, for example, measured. The method step 3 can be followed by the method step 4 in which the current ambient temperature is compared with a predefined temperature, for example a limiting value. If the current ambient temperature is below the limiting value, in the method step 5 which now follows the maximum amount of energy to be stored is limited. The maximum amount of energy to be stored can be limited as a function of the level of the current ambient temperature. If the current ambient temperature is further below the limiting value, the maximum amount of energy to be stored can be predefined with a lower value than if the current ambient temperature is closer to the limiting value.

If the current ambient temperature is not below the limiting value, the method step 4 can be followed by the method step 6 in which the method 1 ends. Alternatively, the method step 6 follows the method step 5, for example if the maximum amount of energy to be stored is reached or undershot. If the energy which is stored is above the maximum amount of energy to be stored, the energy which is stored can be reduced to the maximum amount of energy to be stored and for this purpose can be conducted, for example, to the consumer. After the method step 8, the stored energy can be monitored in order to prevent more than the predefined maximum amount of energy to be stored from being stored.

Figure 2:
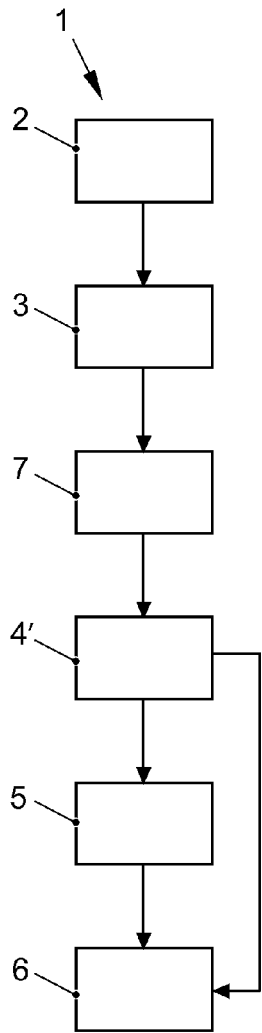

FIG. 2 shows a further exemplary embodiment of the method 1 according to the invention in a schematic form as a flowchart. The same reference symbols are used for elements which correspond in function and/or design to the elements of the exemplary embodiment in FIG. 1.

For the sake of brevity, details are given only on the differences from the exemplary embodiment in FIG. 1.

The method steps 2 and 3 of the method 1 illustrated in FIG. 2 correspond to the method steps 2 and 3 of the exemplary embodiment in FIG. 1. However, the method step 3 in the exemplary embodiment in FIG. 2 is followed by a method step 7 in which, on the basis of the current ambient temperature, an ambient temperature which is expected at a starting process of the fuel cell device and/or of the consumer which is expected to take place is estimated.

In a method step 4' which follows the method step 7, the expected ambient temperature is compared with the predefined temperature, for example a threshold value. If the expected ambient temperature is below the threshold value, in the following method step 5 the energy to be stored is limited. The difference between the threshold value and the expected ambient temperature can be inversely proportional here to the level of the limitation of the maximum quantity of energy to be stored. If the energy which is stored is above the maximum quantity of energy to be stored, the energy which is stored can be reduced at least as far as the maximum quantity of energy to be stored and for this purpose can be conducted, for example, to the consumer. The method step 5 is followed again by the method step 6 in which the method 1 ends. If the expected ambient temperature is not below the threshold value, the method step 4' can be followed immediately by the method step 6.

Figure 3:
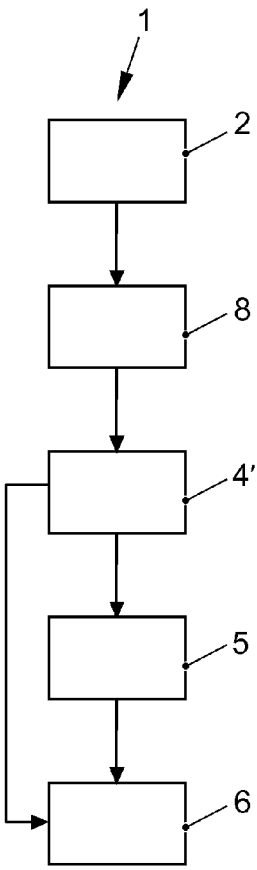

FIG. 3 shows a further exemplary embodiment of the method 1 according to the invention in a schematic form as a flowchart. The same reference symbols are used for elements which correspond in function and/or design to the elements of the exemplary embodiments in FIGS. 1 and 2. For the sake of brevity, details are given only on the differences from the previous exemplary embodiments.

The method 1 starts with the method step 2 which can be followed by the method step 8. In the method step 8, the ambient temperature which is expected at a future starting process is received. In the method step 4' which now follows, the expected ambient temperature is compared with the predefined temperature, for example the threshold value. On the basis of the comparison it is determined whether the energy to be stored in the method step 5 is to be limited. If the energy which is stored is above the maximum quantity of energy to be stored, the energy which is stored can be reduced at least as far as the maximum quantity of energy to be stored and for this purpose can be conducted, for example, to the consumer. Following the method step 5, the method ends in the method step 6 if the amount of energy to be stored is to be limited. If the expected ambient temperature is not below but rather above the threshold value, the method step 4 can also be followed directly by the method step 6.

Figure 4:
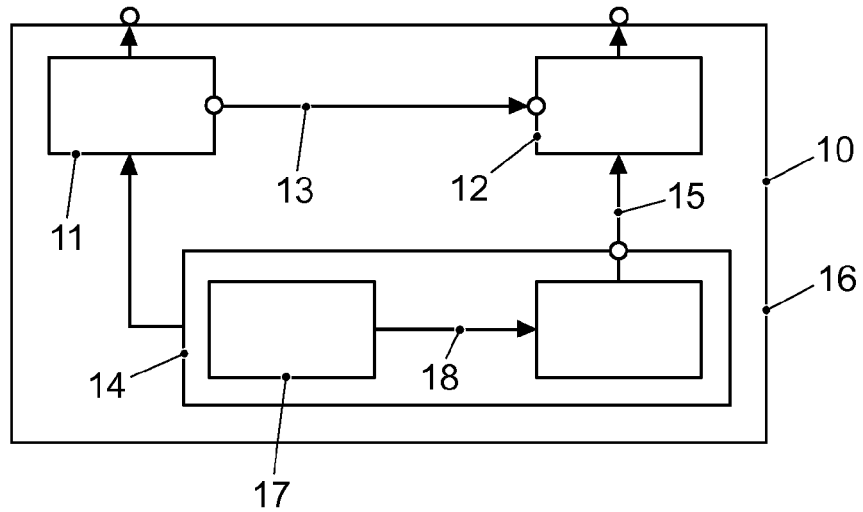
FIG. 4 shows an exemplary embodiment of a fuel cell device according to the invention.

FIG. 4 is a schematic view of a first exemplary embodiment of a fuel cell device according to the invention which can be designed, in particular, to carry out the method according to the invention.

The fuel cell device 10 has a fuel cell 11 and an accumulator 12 for storing electrical energy. The accumulator 12 and the fuel cell 11 are connected to one another in an energy-transmitting fashion by an energy line 13. In this context, the energy line 13 can connect the fuel cell 11 directly or indirectly to the accumulator 12.

In addition, the fuel cell device 10 according to the exemplary embodiment in FIG. 4 having a control device 14 is illustrated. The control device 14 is connected to the accumulator 12 in a control signal-transmitting fashion by a control line 15. In particular, the control device 14 can have a charge limiter 16 which can make available an operating parameter of the accumulator 12 which can be transmitted as a control signal to the accumulator 12. The operating parameter is preferably the maximum amount of energy to be stored in the accumulator 12. The accumulator 12 in FIG. 1 can therefore have electronic elements, for example a battery management system, which can be used to set the maximum quantity of energy to be stored in the accumulator 12. Alternatively, the fuel cell device 10 can have an electronic unit, for example the battery management system, which is embodied separately from the accumulator 12, is connected to the charge limiter 16 in a control signal-transmitting fashion by the control line 15 and which sets the maximum amount of energy to be stored in the accumulator 12. It is also possible for the battery management system to be part of the control device 14.

In order to be able to limit the maximum quantity of energy to be stored as a function of a current or expected ambient temperature of the fuel cell device 10, the fuel cell device 10 preferably has an ambient temperature-determining unit 17 which can be, for example, part of the control device 14. The ambient temperature-determining unit 17 is connected in the exemplary embodiment in FIG. 4 to the charge limiter 16 in a data-transmitting fashion by a data line 18. During the operation of the fuel cell device 10, a data signal, representing the current or the expected ambient temperature, is transmitted from the ambient temperature-determining unit 17 to the charge limiter 16 via the data line 18. The battery management system can also be part of the ambient temperature-determining unit 17.

If the maximum quantity of energy to be stored is to be limited only on the basis of the currently prevailing temperature, it may be sufficient if the ambient temperature-determining unit 17 has a temperature sensor. If the expected ambient temperature is to be estimated on the basis of the current ambient temperature, the ambient temperature-determining unit 17 can have, as an alternative to or in addition to the temperature sensor, a temperature prediction unit for predicting the expected ambient temperature. If the expected ambient temperature of the fuel cell device 10 is to be made available by an external data source, the ambient temperature-determining unit 17 can have a data input for receiving data representing expected ambient temperatures.

Figure 5:
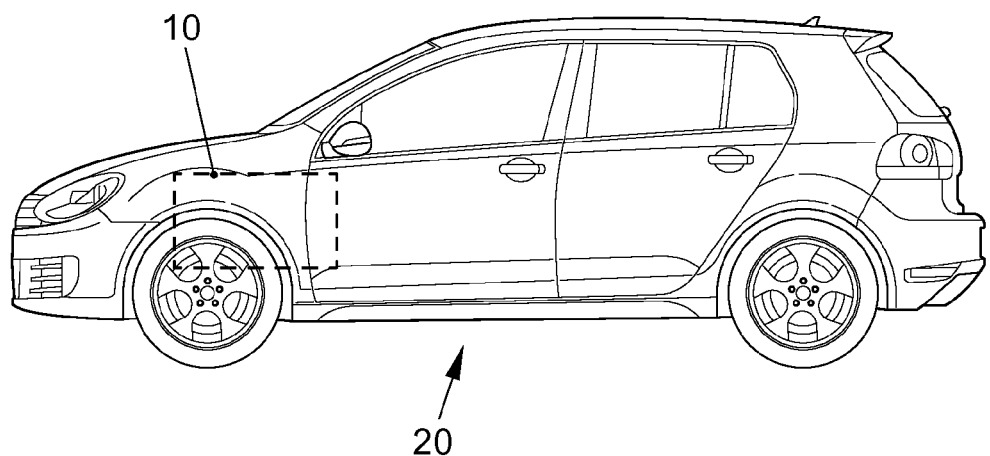
FIG. 5 shows an exemplary embodiment of a motor vehicle according to the invention.

FIG. 5 is a schematic view of an exemplary embodiment of a motor vehicle according to the invention having a fuel cell device, wherein the same reference symbols are used for elements which correspond in function and/or design to the elements of the exemplary embodiment in FIG. 4.

FIG. 5 is a schematic view of a motor vehicle 20 having the fuel cell device 10 according to the invention. For example, the fuel cell device 10 makes available drive energy for the motor vehicle 20, wherein the motor vehicle 20 can be driven at least partially or even completely with energy made available by the fuel cell device 10.

LIST OF REFERENCE SYMBOLS

1 Method
2 Start
3 Determine ambient temperature
4, 4' Compare ambient temperature with predefined temperature (limiting value/threshold value)
5 Limit energy to be stored
6 End
7 Determine expected ambient temperature
8 Receive expected ambient temperature
10 Fuel cell device
11 Fuel cell
12 Accumulator
13 Energy line
14 Control device
15 Control line
16 Charge limiter
17 Ambient temperature-determining unit
18 Data line
20 Motor vehicle

The invention claimed is:

1. A method for operating a fuel cell device, the method comprising:
   making electrical energy available from a fuel cell, and
   at least partially storing the electrical energy in a suitable energy storage device,
   wherein a maximum amount of electrical energy to be stored is predefined as a function of an ambient temperature of the fuel cell.

2. The method of claim 1, further comprising comparing the ambient temperature with a predefined temperature and limiting the maximum amount of electrical energy to be stored if the ambient temperature is below the predefined temperature.

3. The method of claim 1, further comprising determining an ambient temperature which is expected to prevail during an imminent starting process as the ambient temperature.

4. The method of claim 1, further comprising predefining the maximum amount of electrical energy to be stored in a limited way such that a difference in electrical energy between a maximum amount of electrical energy which can be stored and the predefined maximum amount of electrical energy to be stored is sufficient for the fuel cell to heat itself up sufficiently by means of internal losses when the difference in electrical energy is made available at a start of the fuel cell device operation.

5. The method of claim 1, wherein storing the electrical energy is done at least partially in an accumulator of the fuel cell.

6. A fuel cell device comprising
a fuel cell,
an accumulator for storing electrical energy, which is connected to the fuel cell in an electrical energy-transmitting fashion,
an ambient temperature-determining unit, and
a charge limiter which is adapted to limit a maximum amount of electrical energy to be stored in the accumulator as a function of a control signal of the ambient temperature-determining unit.

7. The fuel cell device of claim 6, wherein the ambient temperature-determining unit comprises a temperature prediction unit for predicting expected ambient temperatures.

8. The fuel cell device of claim 6, wherein the ambient temperature-determining unit comprises a data input for receiving temperature data representing expected ambient temperatures.

9. The fuel cell device of claim 6, wherein the accumulator is a rechargeable battery which stores drive electrical energy for a motor vehicle.

10. A motor vehicle comprising a drive system and the fuel cell device of claim 6, wherein the fuel cell device is connected to the drive system in an electrical drive energy-transmitting fashion.

* * * * *